United States Patent Office 3,704,202
Patented Nov. 28, 1972

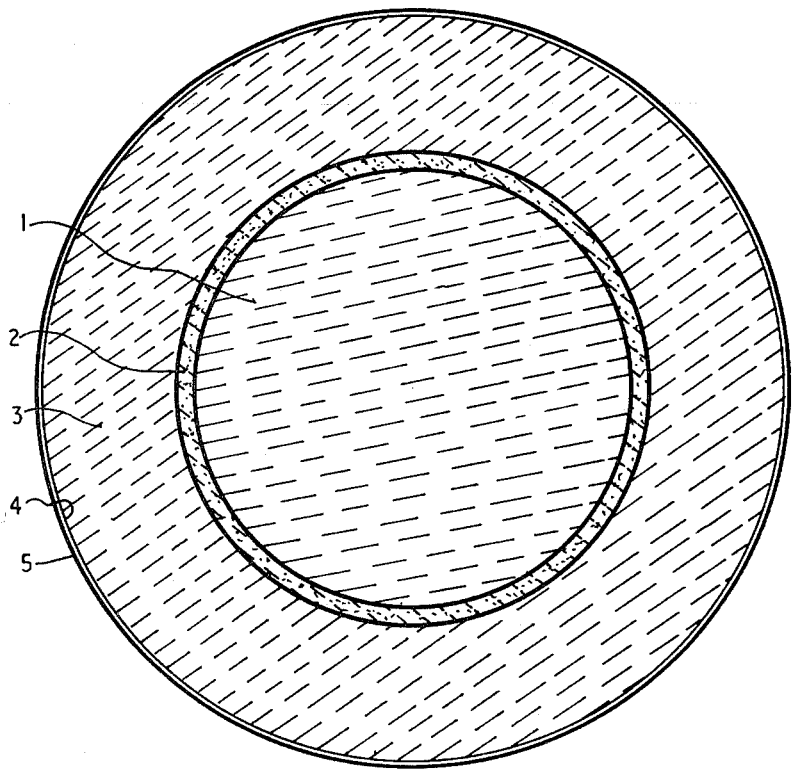

3,704,202
FUEL ELEMENT FOR HIGH TEMPERATURE NUCLEAR REACTOR
Keith Desmond Reeve, Caringbah, New South Wales, and Eric John Ramm, Lilli Pilli, New South Wales, Australia, assignors to Australian Atomic Energy Commission, Coogee, New South Wales, Australia
Filed May 5, 1970, Ser. No. 34,803
Claims priority, application Australia, May 5, 1969, 54,403/69
Int. Cl. G21c 3/20
U.S. Cl. 176—68                                    1 Claim

ABSTRACT OF THE DISCLOSURE

A substantially spherical fuel element for nuclear reactors comprises a core containing a finely divided solid solution of fuel dispersed in a fine grained beryllia matrix, a dense outer shell of fine grained beryllia, a buffer zone of porous beryllia between said core and said shell, a dense outer coating of alumina on said outer shell and a thin layer of crysoberyl as a bond between the alumina coating and said shell.

SUMMARY OF THE INVENTION

This invention relates to an entirely novel type of fuel element for nuclear reactors wherein the fuel is dispersed in finely divided solid solution in a fine grained beryllia matrix as the core of a substantially spherical element.

In accordance with the invention a substantially spherical fuel element for nuclear reactors comprises a core containing a finely divided solid solution of fuel ($UO_2$ and/or $ThO_2$ and/or $PuO_2$) dispersed in a fine grained beryllia matrix, a dense outer shell of fine grained beryllia, a buffer zone of porous beryllia between said core and said shell, a dense outer coating of alumina on said outer shell and a thin layer of chrysoberyl as a bond between the alumina coating and said shell.

The fuel elements of the invention and the preferred method of producing same will be more readily understood from the ensuing description taken in conjunction with the accompanying drawing.

DESCRIPTION OF THE DRAWING AND PREFERRED EMBODIMENT

The drawing is a cross-sectional view of a spherical fuel element in accordance with the invention.

In producing fuel elements in accordance with the invention the beryllia-fuel mixture is formed into an approximate sphere 1 at a low pressure in a steel die. Highly sinterable BeO powder is essential. A slurry 2 of high-fired BeO powder in a suitable vehicle, incorporating an organic material, for example, saturated camphor-alcohol solution is sprayed onto the core. Two hemispherical BeO shells 3 are formed in a steel die at a low pressure from highly sinterable BeO powder, the shells 3 are assembled over the sprayed core 1 and 2 and the whole is isostatically pressed at high pressure. A thin layer 4 of BeO plus $Al_2O_3$ powder in a suitable vehicle, for example water, may be sprayed as a slurry onto the surface to form an undercoat (which during sintering becomes chrysoberyl), and then a thicker layer 5 of sinterable alumina is sprayed as a slurry, preferably an aqueous slurry, onto the undercoat surface. The step of spraying on the undercoat is optional since the chrysoberyl layer will result in any event at the interface between the shells 3 and the alumina layer 5. Finally, the element is again pressed isostatically, dried out slowly and sintered at a high temperature in a dry gas air preferably. During irradiation in a reactor, the buffer zone 2 of porous BeO takes up expansion of the core 1, by a creep process; acts to cushion $\beta$-particle damage to the shell 3 and reduces the stress level in the shell. The BeO shell 3 is highly fission-product retentive. The alumina coating 5 is strongly bonded to the shell 3 by virtue of the chrysoberyl undercoat 4 and it protects the element from loss of BeO at high temperatures in moist air. As a result elements can be produced in accordance with the present invention which can be used in a reactor at temperatures between 500° C. and 1200° C. in a gas such as air for periods of at least one year with very low corrosion and fission-product release rates.

What we claim is:

1. A substantially spherical fuel element for nuclear reactors comprising a core containing a finely divided solid solution of fuel dispersed in a fine grained beryllia matrix, a dense outer shell of fine grained beryllia, a buffer zone of porous beryllia between said core and said shell, a dense outer coating of alumina on said outer shell and a thin layer of chrysoberyl as a bond between the alumina coating and said shell.

References Cited

UNITED STATES PATENTS

| | | | |
|---|---|---|---|
| 3,121,047 | 2/1964 | Stoughton et al. | 176—91 X |
| 3,158,547 | 11/1964 | Smith | 176—69 |
| 3,166,614 | 1/1965 | Taylor | 176—91 X |
| 3,290,223 | 12/1966 | Blocher et al. | 176—91 S.P. |
| 3,334,997 | 8/1967 | Caillat et al. | 176—91 X |
| 3,361,638 | 1/1968 | Bakros et al. | 176—67 |
| 3,431,328 | 3/1969 | Case et al. | 264—.5 |
| 3,494,785 | 2/1970 | Barr et al. | 176—91 X |

OTHER REFERENCES

Corrosion and Rad. Damage Resistant Fuel Material, A.E.C. Report NYO–9187, September 1961, pp. 92-119.

CARL D. QUARFORTH, Primary Examiner

G. G. SOLYST, Assistant Examiner

U.S. Cl. X.R.

176—69, 91 S.P.